US009700979B2

(12) United States Patent
Schwaiger (10) Patent No.: US 9,700,979 B2
(45) Date of Patent: Jul. 11, 2017

(54) BELT TENSIONER FOR DRILL PRESS

(71) Applicant: Barry M. Schwaiger, Murfreesboro, TN (US)

(72) Inventor: Barry M. Schwaiger, Murfreesboro, TN (US)

(73) Assignee: JPW Industries Inc., La Vergne, TN (US)

( * ) Notice: Subject to any disclaimer, the term of this patent is extended or adjusted under 35 U.S.C. 154(b) by 0 days.

(21) Appl. No.: 14/844,199

(22) Filed: Sep. 3, 2015

(65) Prior Publication Data
US 2016/0067841 A1 Mar. 10, 2016

Related U.S. Application Data

(60) Provisional application No. 62/047,303, filed on Sep. 8, 2014.

(51) Int. Cl.
| | |
|---|---|
| *B23B 39/16* | (2006.01) |
| *B23Q 5/14* | (2006.01) |
| *B23B 39/10* | (2006.01) |
| *B23Q 5/12* | (2006.01) |
| *B23Q 5/04* | (2006.01) |

(Continued)

(52) U.S. Cl.
CPC ............... *B23Q 5/14* (2013.01); *B23B 39/10* (2013.01); *B23B 39/167* (2013.01); *B23Q 5/048* (2013.01); *B23Q 5/12* (2013.01); *F16H 7/1281* (2013.01); *F16H 9/06* (2013.01); *F16H 2007/088* (2013.01); *Y10T 408/67* (2015.01)

(58) Field of Classification Search
CPC ....... Y10T 408/67; B23B 39/167; B23Q 5/12; B23Q 5/14; B23Q 5/142; B23Q 5/048; B23Q 5/04; B23Q 5/046; F16H 9/06

USPC .................................................... 474/80, 81
See application file for complete search history.

(56) References Cited

U.S. PATENT DOCUMENTS

| | | | | |
|---|---|---|---|---|
| 1,082,994 A | * | 12/1913 | Becker ..................... | B23Q 1/70 408/126 |
| 2,474,500 A | * | 6/1949 | Stein ........................ | B23Q 5/04 123/198 D |

(Continued)

FOREIGN PATENT DOCUMENTS

| | | |
|---|---|---|
| DE | 3736015 A1 | 5/1989 |
| EP | 1221000 A1 | 7/2002 |

(Continued)

OTHER PUBLICATIONS

Communication from European Patent Office dated Feb. 9, 2016.

*Primary Examiner* — Sunil K Singh
*Assistant Examiner* — Nicole N Ramos
(74) *Attorney, Agent, or Firm* — Schiff Hardin LLP (57) ABSTRACT

A drill press has variable speed drive via belts on stepped pulleys that transfer rotational force from the motor to the drill press spindle. Three stepped pulleys connected by two belts are provided in the example. A belt tension roller is bears against one of the belts to provide tension for effective power transfer from the motor to the spindle. The belt tension roller is adjustable along an arcuate slot in an anchor plate and is fastenable in position by an adjustment knob on the belt tension roller. The middle pulley is mounted to vary its position so that tension adjustments on one belt by the belt tension roller result in tension adjustments on the second belt as well.

11 Claims, 9 Drawing Sheets

(51) Int. Cl.
 *F16H 9/06* (2006.01)
 *F16H 7/08* (2006.01)
 *F16H 7/12* (2006.01)

(56) References Cited

U.S. PATENT DOCUMENTS

| | | | | |
|---|---|---|---|---|
| 3,216,266 A | * | 11/1965 | Sunnen | F16H 9/04 474/134 |
| 3,762,229 A | * | 10/1973 | Johnson | F16H 9/06 474/120 |
| 4,199,285 A | * | 4/1980 | Bader | B23Q 1/70 173/29 |
| 4,474,562 A | | 10/1984 | Heurich | |
| 5,730,672 A | * | 3/1998 | Lin | F16H 9/14 408/128 |
| 6,167,686 B1 | * | 1/2001 | Becker | A01D 41/142 474/109 |
| 6,689,002 B1 | | 2/2004 | Hascoat | |
| 6,779,952 B2 | * | 8/2004 | Zhang | B23Q 5/162 408/128 |
| 2011/0306451 A1 | | 12/2011 | Montplaisir | |
| 2012/0048586 A1 | | 3/2012 | Montplaisir et al. | |

FOREIGN PATENT DOCUMENTS

| | | |
|---|---|---|
| JP | H10267094 A | 10/1998 |
| WO | WO0057085 | 9/2000 |

\* cited by examiner

BELT TENSIONER FOR DRILL PRESS

CROSS-REFERENCE TO RELATED APPLICATION

This application claims the benefit of U.S. Provisional Patent Application Ser. No. 62/047,303, filed Sep. 8, 2014, which is incorporated herein by reference.

BACKGROUND OF THE INVENTION

Field of the Invention

The present invention relates generally to a power tool that may be a drib press, and more particularly to belt tensioner for use in a drill press.

Description of the Related Art

Drill presses are commonly available tools in both commercial and home workshops. A common configuration of a drill press, also known as a pedestal drill, pillar drill, or bench drill, includes a stand that supports a work table, above which is a drill head. The stand may be configured for support on the floor or on a bench or other surface. The drill head includes a number of handles, or a wheel, that is operable to control the vertical movement of a spindle and chuck for holding a drill bit or other tool. A motor in the drill head drives the spindle and chuck. The drill bit or other tool in the chuck may be lowered toward a work piece on the work table by user manipulation of the handles or wheel as the chuck and spindle are driven so that the work piece is drilled or otherwise shaped or formed. User manipulation of the handles or wheel in a reverse direction raises the drill bit from the work piece.

A drill press may be used to drill holes or form materials using the tool held in the chuck. The drill press may have a more powerful motor than a hand-held drill to facilitate drilling and forming of harder materials or to provide faster working of the material. The drill press may be used to control the accuracy of drilling or forming by controlling the drilling location, angle of the bore, and even the depth of the bore more readily than a hand drill. Larger bits may be used without strain on the user's hand and wrist. Less effort is needed to operate the drill press compared to a hand drill. The drill press may drill holes more accurately and more consistently compared to a hand drill, with a more powerful motor.

Drill presses may be operated at different speeds. One way of providing differing speed operation of the drill press is by use of a belt that is selectively movable to different positions on a stepped pulley arrangement that transfers rotational energy from the motor to the spindle. In belt driven drill presses, the belt must be capable of being moved from step to step in the stepped pulley arrangement. After adjustment of the belt position, it must be possible to apply tension to the belt to avoid slipping of the belt on the pulleys.

A known drill press (shown in U.S. Pre-Grant Publication 2011/0306451) includes an idler roller that presses on the belt to provide tension to the belt during operation of the drill press. The idler roller may be adjusted between two settings and includes a spring acting on the roller to provide tension on the belt.

It is possible for the belt to slip during use of the drill press, as a result of which the drill press does not use all of the power of the motor. Power is lost in the transfer of energy from the motor to the spindle. It is possible to stall a drill bit in a work piece during use of the drill press. If some of the motor power is lost in the transfer, the drill bit will stall at a lower power if the belt connecting the pulleys slips on one or both pulleys. On the other hand, if all of the motor's power is being transferred to the drill bit, the drill press will not stall until the motor stalls, which provides greater power to the drill bit if the belt is not slipping.

SUMMARY

The present method and apparatus provides a drill press with a variable speed drive using a belt and pulley arrangement, and an adjustable belt tensioner on a drive belt of the belt and pulley arrangement. The adjustable belt tensioner enables the user to adjust the tension on at least one drive belt of the drill press. The user may control the amount of tension applied to the belt to thereby control the power transfer from the motor to the spindle of the drill press. In certain embodiments, the tension on the belt may be adjusted in a continuous fashion from less to more tension without incremental steps, and with less force being required by the user.

DETAILED DESCRIPTION OF THE PREFERRED EMBODIMENTS

Figure 1:
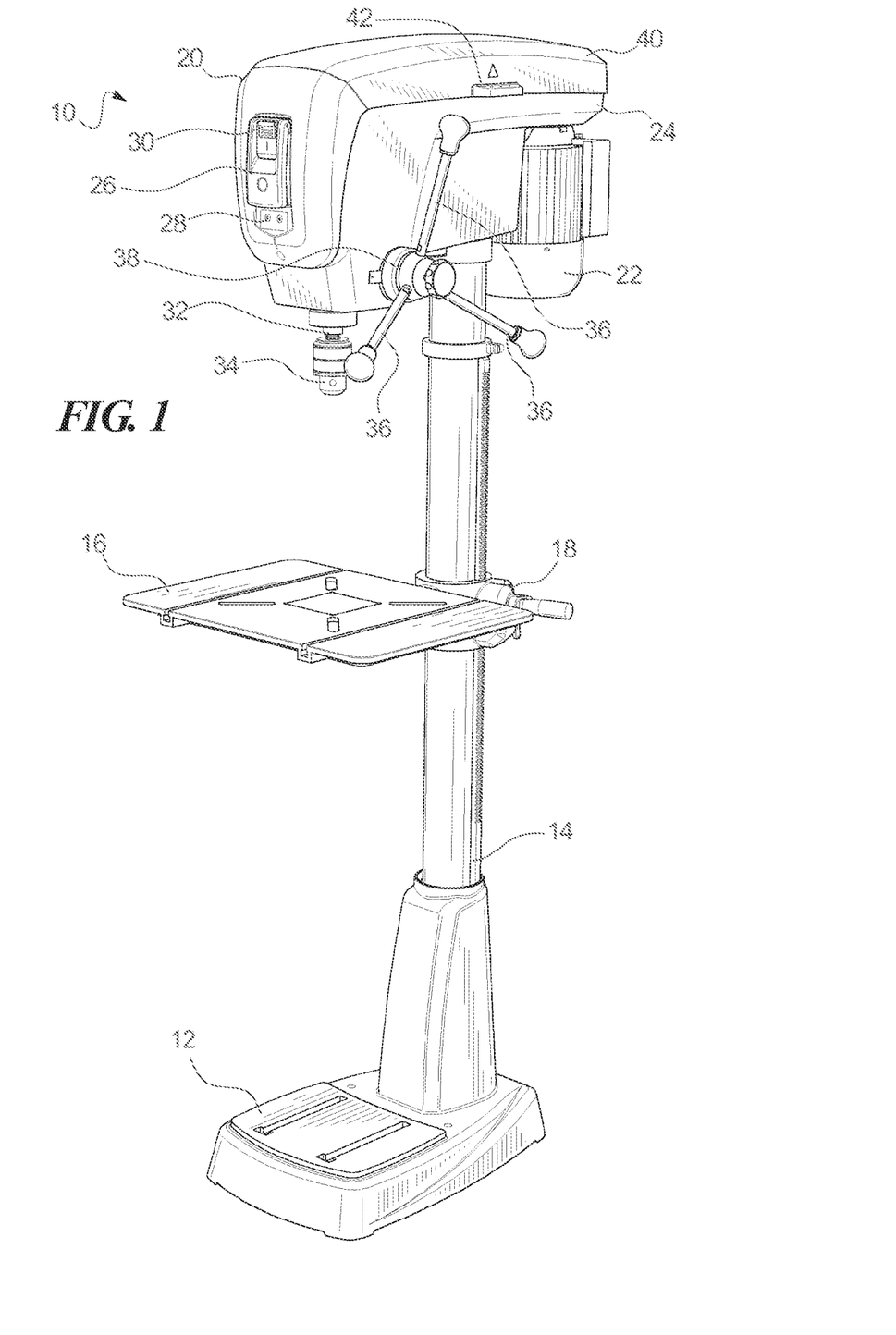
FIG. 1 is a front, right perspective view of a drill press according to the present method and apparatus.

Referring first to FIG. 1, a drill press 10 includes abase 12 that may be supported on a floor or on a workbench or other surface. From the base 12 extends a column 14 that provides a vertical support for a work table 16. The table 16 may be adjusted to various positions along the column 14 and locked into preferred positions by a table lock 18. Mounted on the column 14 above the table 16 is drill press head 20 that includes a motor 22 affixed to a housing 24. The motor 22 is mounted at the back of the housing 24, while at the front of the housing 24 is a power panel 26 that includes indicators 28 to show the operating status of the drill press 10 and a power switch 30 to control the operation of the motor 22.

From the housing 24 extends a spindle 32 on which is mounted a chuck 34 for holding drill bits and other tools. The spindle 32 and chuck 34 may be raised and lowered in the head 20 by operation of a feed lever 36. Three such feed levers 36 are shown on the illustrated embodiment, although one, two, four or more are possible. It is also possible that a wheel or other mechanism may be provided for raising and lowering the spindle 32 and chuck 34. The feed levers 26 are connected to a hub 38 of a vertical drive apparatus mounted within the housing 24, the construction of which is well known in the art. The feed levers 36 permit the user to lower the chuck 34 by rotating the forward part of the feed lever downward, for example to bring a drill bit in the chuck 34 into contact with a work piece on the table 16. The vertical drive apparatus of certain embodiments is biased to raise the chuck 34 when downward force on the feed lever 36 is decreased.

The illustrated example of the drill press 10 may be operated at different speeds. To change the operating speed, the housing 24 includes a cover 40 that may be opened to provide user access to the speed varying mechanism within the housing 10. A handle 42 is provided on the cover 40 by which the user may move the cover 40 to an open position.

Figure 2:
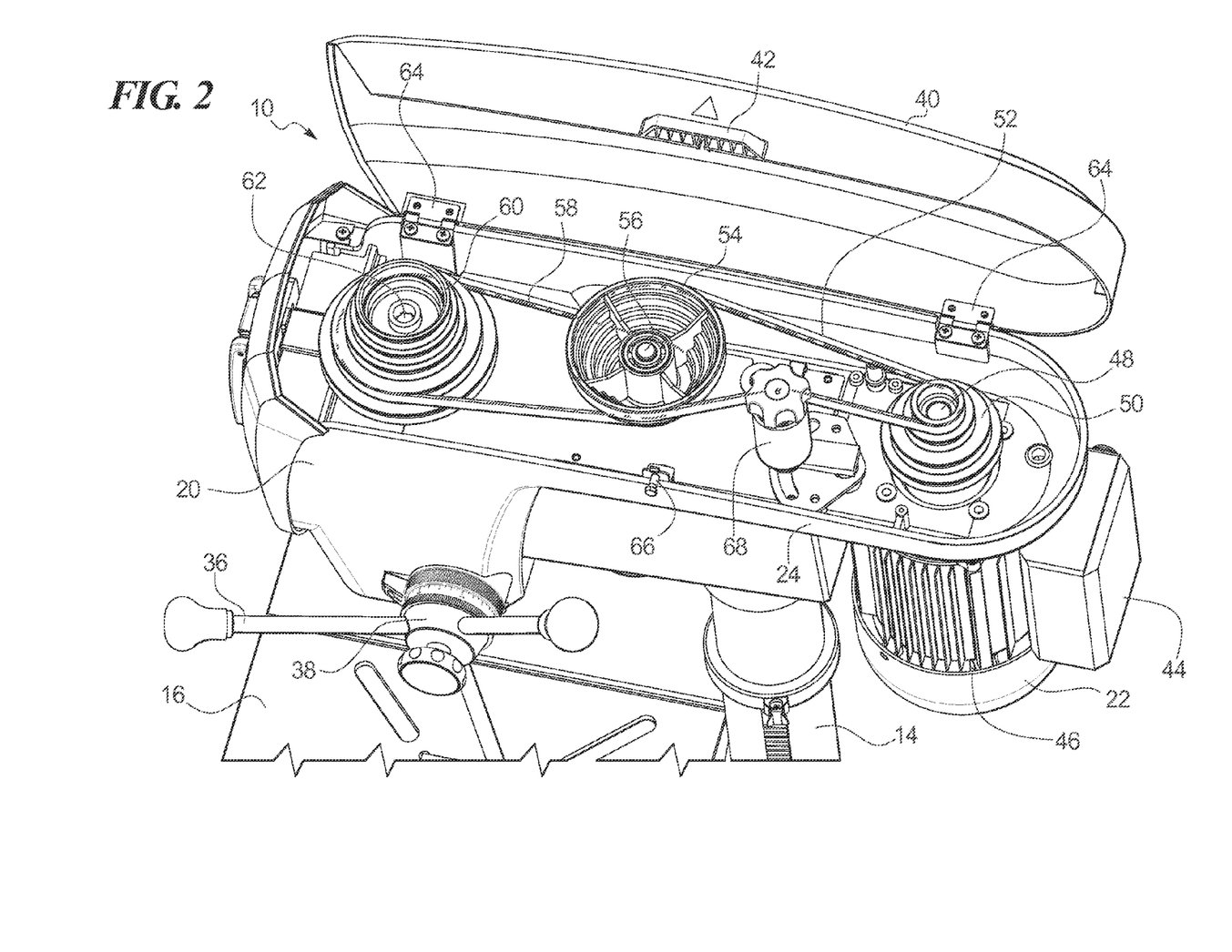
FIG. 2 is a top, side perspective view of the drill press of FIG. 1 showing a top cover moved to an open position.

With reference to FIG. 2, the drill press 10 includes the housing 24 to which the motor 22 is mounted. The motor 22 of the illustrated example has a motor control box 44 within which is motor control circuitry, as is known. The motor 22 also has cooling fins 46 mounted on its outer surface. The motor 22 has a motor shaft 48 that extends into the housing 24. On the motor shaft 48 is mounted a first stepped pulley 50. The first stepped pulley 50 has a first belt 52 on the pulley. The first belt 52 extends from the first stepped pulley 50 to a second stepped pulley 54 that is mounted on a second pulley shaft 56. A second belt 58 is mounted on the second stepped pulley 54. The second belt 58 extends between the second stepped pulley 54 and a third stepped pulley 60. The third stepped pulley 60 is mounted on a spindle shaft 62 that is connected to drive the spindle 32 and chuck 34. The pulleys and belts comprise a drive train to transfer rotational force, or torque, from the motor 22 to the chuck 34 of the drill press 10. The second stepped pulley 54 may be referred to as an intermediary pulley. The belts 52 and 58 may be V belts, toothed belts, or other types of belts. The pulleys have a corresponding structure to engage the belts 52 and 58.

The diameter relationships between the pulleys 50, 54 and 60 result in the higher speed rotation of the motor 22 being translated into slower speed rotation of the chuck 34, while providing a corresponding increase in power at the chuck 34 in return for the slower speed. In the illustrated arrangement of pulleys and belts, operation of the motor 22 at a first motor speed will result in a first spindle speed at the spindle. The first spindle speed is lower than the first motor speed in this example. The speed of rotation of the spindle, and thus the drill bit or other tool, may be varied by varying the speed of the motor 22. Motors may have the ability to operate over a range of speeds, or may be fixed speed motors. The user may wish to operate the drill press 10 at a different speed outside the range of speeds possible by varying the motor speed, or may wish to change the operating speed of the drill press 10 that has a fixed speed motor.

To accomplish the change of speed, the user opens the cover 40 to the position as shown in FIG. 2. The cover 40 remains attached to the housing 24 by hinges 64 when moved between a closed position and an open position. The cover 40 is secured in the closed position by a latch 66 on the housing 24. The user may operate the latch 66 to gain access to the interior of the housing 24. Once the cover 40 is open and the drill press is off, and preferably unplugged, the user may move one or both belts 52 and 58 to different channels on the stepped pulleys 50, 54 and 60. By moving the belts to the different positions on the pulleys, the diameter relationships of the pulleys are changed, resulting in a speed change at the spindle for a predetermined speed of operation of the motor 22. The speed change is effective to change the speed of the chuck 34 regardless of whether the motor 22 operates at a fixed speed or is operable over a range of speeds.

During use of the drill press 10 it is important that the belts 52 and 58 are effective is transferring rotational force, or torque, from the motor 22 to the spindle 32 and chuck 34. If one or both of the belts 52 and 58 are loose, power is lost. To provide tension on the belts 52 and 58, a belt tensioning apparatus is provided that includes a belt tension roller 68 that presses on the belt 52.

Figure 3:
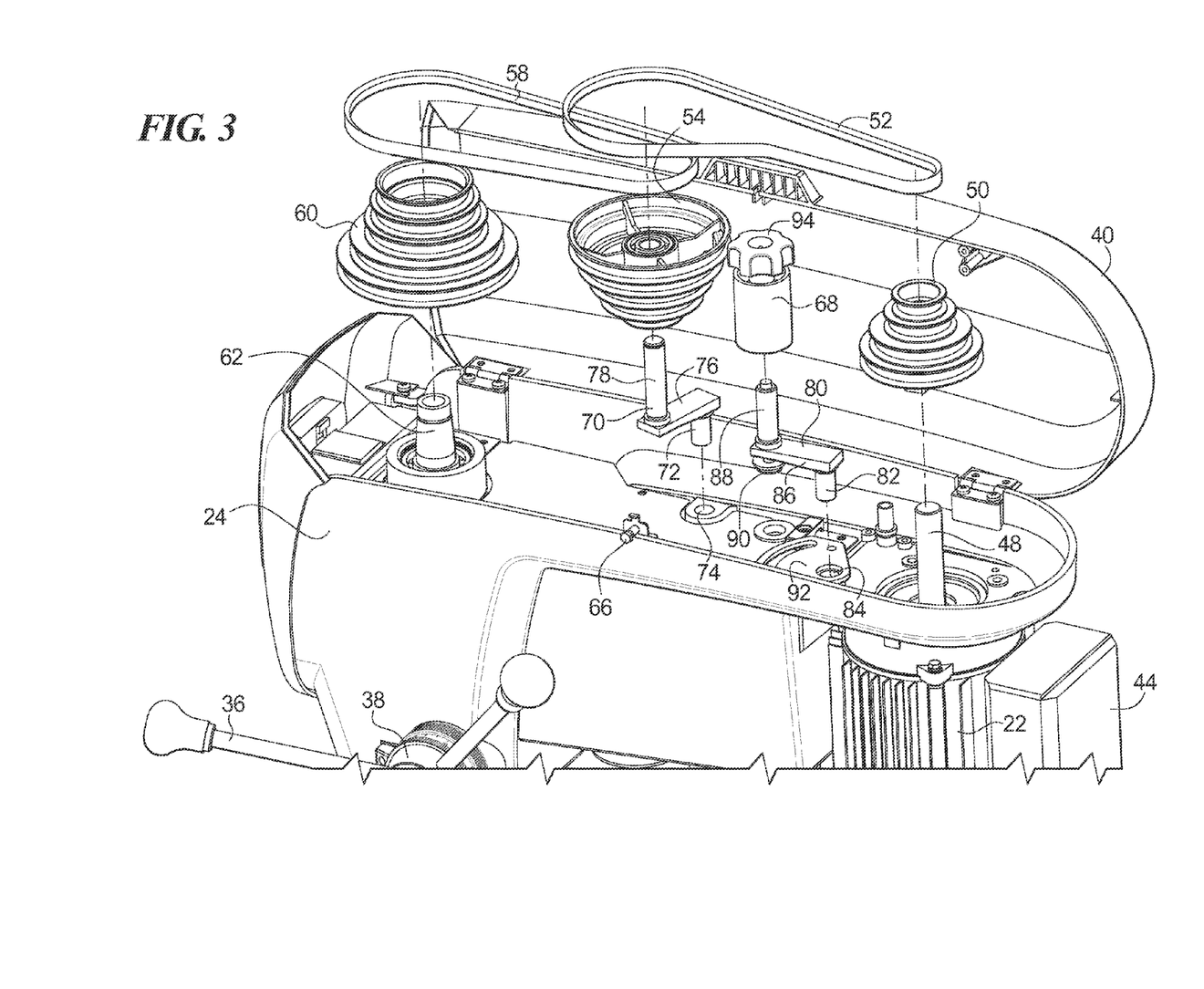
FIG. 3 is a top, back, side perspective view of the drill press of FIG. 1 showing the top cover open and drive transmission elements in exploded view.

In FIG. 3, the belts 52 and 58 and pulleys 50, 54 and 60 are in exploded view to reveal their mountings. The motor shaft 48 extends into the housing 24 to enable the first stepped pulley 50 to be mounted thereon. A set screw, key and keyway, or other structure may be provided to ensure that the pulley 50 rotates with the motor shaft 48. The first stepped pulley 50 includes four steps of different diameters, although more or fewer steps are also possible. Both the second stepped pulley 54 and the third stepped pulley 60 include five steps, although more or fewer steps may be provided. The third stepped pulley 60 is mounted on the spindle shaft 62 that rotates with the spindle 32 and chuck 34. The motor shaft 48 and the spindle shaft 62 are both in fixed positions within the housing 24. The second stepped pulley, or intermediary pulley, 54 is mounted on a first offset shaft 70. The first offset shaft 70 has a first end 72 that is mounted in an opening 74 in the housing that permits the first offset shaft 70 to rotate in the opening 74. The first offset shaft 70 includes a transverse member 76 that connects between the first end 72 and a second end 78. The second stepped pulley 54 is mounted on the second end 78. Bearings or other friction reducing means may be provided between the second stepped pulley 54 and the second end 78 of the first offset shaft 70, as well as between the first end 72 of the first offset shaft 70 and the opening 74. The first offset shaft 70 permits the intermediary pulley or second stepped pulley 54 to vary its position between the first and third stepped pulleys 50 as 60 as the belts 52 and 58 are moved to different positions on the stepped pulleys. The intermediary pulley 54 may move freely to the different positions.

Also in FIG. 3, the belt tension roller 68 is provided on a second offset shaft 80. The second offset shaft 80 has a first end 82 that is mounted in an opening 84 in the housing 24. The second offset shaft 80 has a transverse member 86 that extends between the first end 82 and a second end 88. The second end 88 receives the belt tension roller 68 on a portion extending an opposite direction from the first end, i.e. upward from the transverse member in this view. In addition, the second end 88 has an extension 90 that extends through an arcuate slot in an anchor plate 92. The anchor plate 92 is fastened in a fixed position in the housing 24 and provides the arcuate slot that permits the belt tension roller 68 to be fastened at any position along the slot. The user may release the belt tension roller 68 from a position by rotating an adjustment knob 94 on the belt tension roller to a release position. The belt tension roller 68 is moved in an arcuate path along the arcuate slot in the anchor plate 92, to a desired position and the user then rotates the adjustment knob 94 to an engage position to secure the belt tension roller 68 in the desired position. For example, the adjustment knob 94 may threadably engage a threaded portion of the second end 88 of the second offset shaft 80 so that rotation of the adjustment knob 94 compresses the extension 90 against anchor plate 92 when the knob 94 is turned in one direction and releases the compression forces when the knob 94 is turned in the other direction. The belt tension roller 68 is in an example embodiment mounted on bearings to permit free rotation of the roller regardless of the tension applied by the adjustment knob 94.

Figure 4:
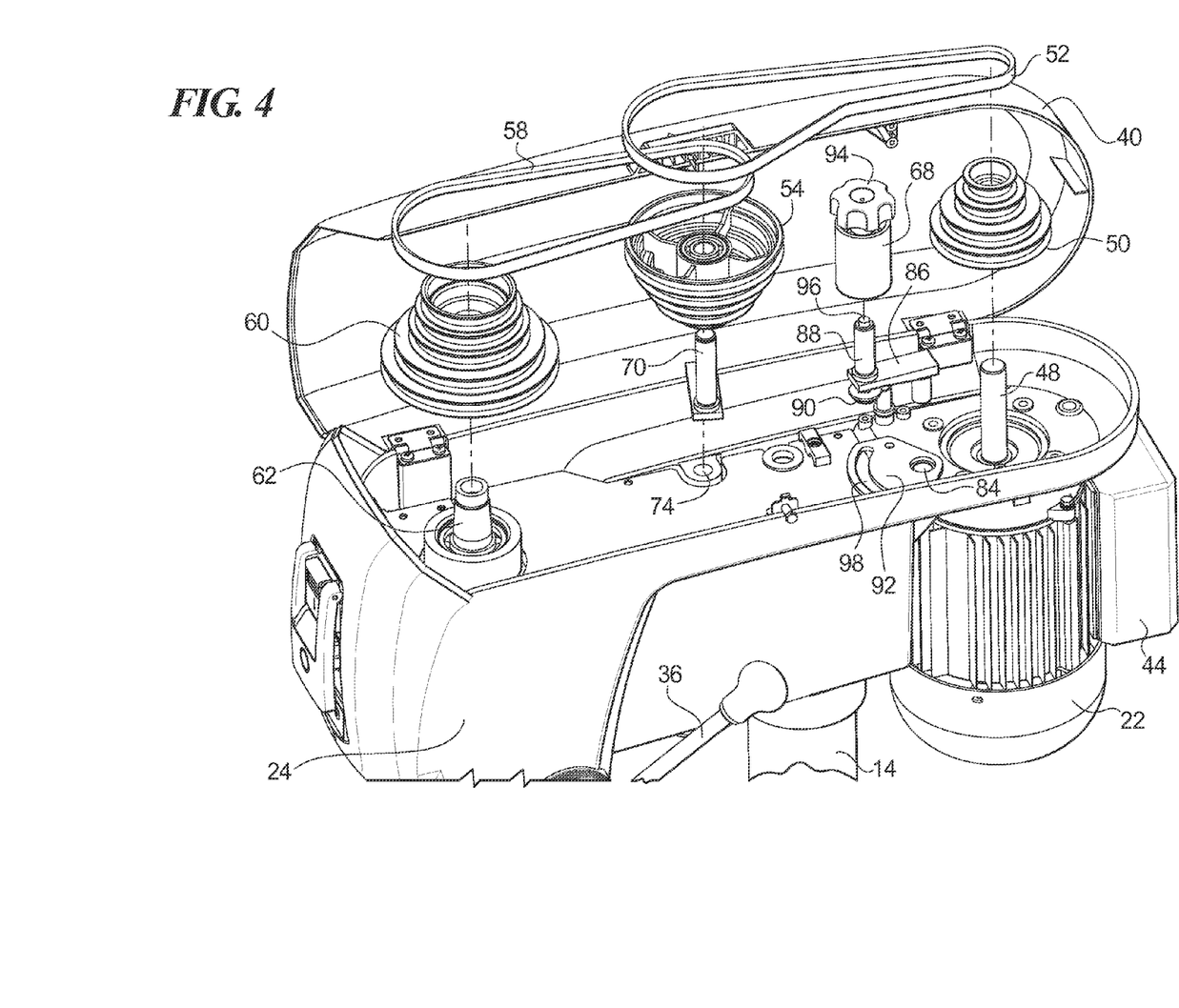
FIG. 4 is a top, front, side perspective view of the drill press with the cover open and the drive elements in exploded view.

In FIG. 4, the belt tension roller 68 has the adjustment knob 94 disposed so that both fit onto the second end 88 of the second offset shaft 80. The second end 88 has a reduced diameter free end 96 that is engaged by the adjustment knob 94. The reduced diameter free end 96 may be threaded or otherwise configured to engage the adjustment knob 94. The anchor plate 92 has the arcuate slot 98 into which the extension 90 extends. In this embodiment, the anchor plate 92 extends to the opening 84 into which the first end 82 of the second offset shaft 80 is mounted. The second offset shaft 80 rotates freely in the opening 84 when the adjustment knob 94 is in the release position. The engagement of the extension 90 in the arcuate slot 98 when the adjustment knob 94 is tightened to the engaged position prevents the second offset shaft 80 from rotating in the opening 84.

The adjustment knob 94 is positioned within easy reach by the user who has the cover 40 open to move the belts 52 and 58 to different positions in the pulleys. The adjustment knob 94 is adjusted to press the belt tension roller 68 against the first belt 52 as shown in FIG. 2 by moving the belt tension roller 68 along the arcuate path of the arcuate slot 98. As tension on the first belt 52 is increased by the belt tension roller 68, the first belt 52 deforms with one leg of the two legs between the pulleys bent at an angle, which shortens the distance between the first and second stepped pulleys 54. The second or intermediary pulley 54 moves by pivoting the first offset shaft 70 around its offset. As the second or intermediary pulley 54 is moved to accommodate the deformation of the first belt 52, increased tension is applied to the second belt 58. The reverse is true for decreasing tension on the belts. As will be understood by those of skill in the art, the continuous adjustment of the belt tensioning roller 68 against the first belt 52 applies a continuous adjustment of tension on both the first belt 52 and the second belt 58. Only a single adjustment of the single roller is necessary for varying the tension in both belts.

Figure 5:
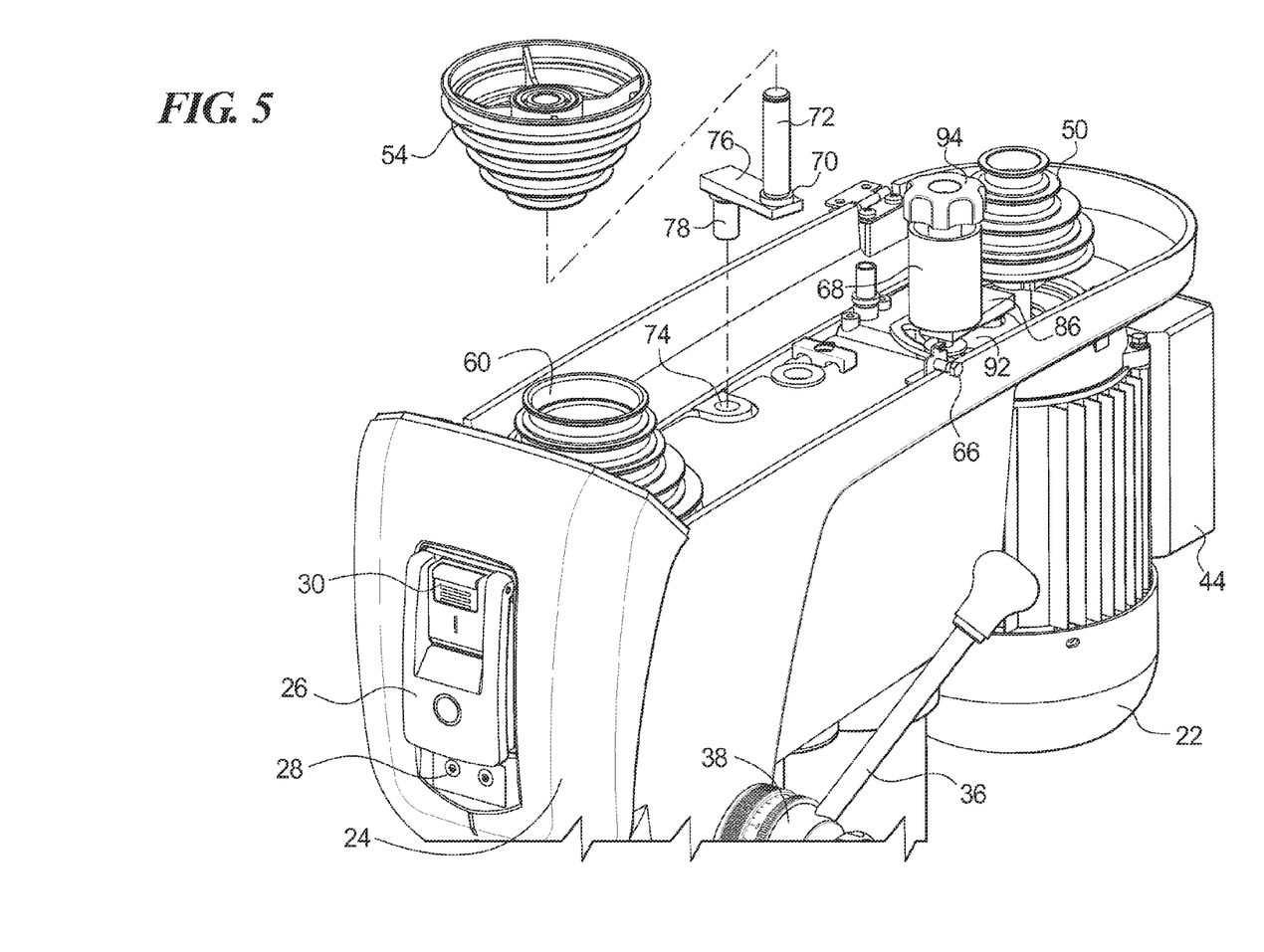
FIG. 5 is a front, side, top perspective view of the drill press without the cover and showing an intermediary pulley in exploded view.

Turning to FIG. 5, the second or intermediary stepped pulley 54 is mounted on the second end 72 of the offset shaft 70 where it rotates freely when driven by the motor 22 via the first belt 52 (not shown in this view). When the tension on the first belt 52 is changed, the first offset shaft 70 pivots about the second end 78 in the opening 74 of the housing 24. The pivoting motion of the first offset shaft 70 permits the second stepped pulley 54 to change positions. Because the second pulley 54 is mounted so that it is free to vary its position, the tension on the second belt is automatically changed by changing the tension on the first belt. Separate belt tension adjustments for the two belts are not required.

Figure 6:
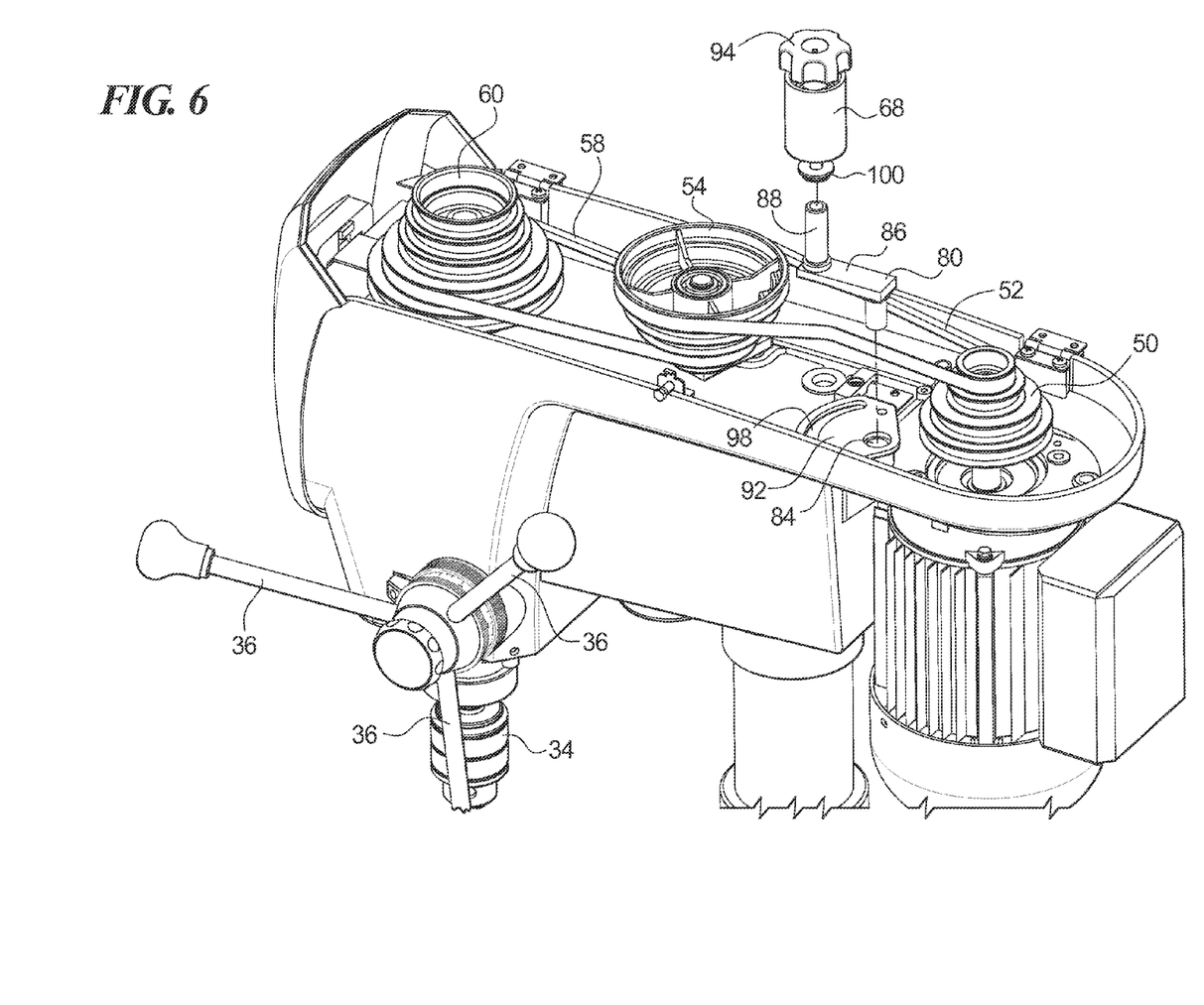
FIG. 6 is a back, side, top perspective view of the drill press without the cover and showing a belt tensioner in exploded view.

With reference now to FIG. 6, the belts 52 and 58 are mounted on the pulleys 50, 54 and 60. As the belts 52 and 58 are moved from step to step on the stepped pulleys 50, 54 and 60 to vary the speed of the chuck 34, the belt tension may vary. To ensure effective transfer of power from the motor 22 to the chuck 34, the adjustment knob 94 on the belt tension roller 68 is operated by the user to permit the belt tension roller 68 to be move to exert more or less lateral force on the first belt 52. A washer assembly 100 is provided between the belt tension roller 68 and the second offset shaft 80 to provide clearance between the belt tension roller 68 and the transverse member 86 of the second offset shaft so that free rotation of the belt tension roller 68 is possible as it bears against the moving first belt 52 to exert tension force thereon. The second offset shaft 80 is prevented from pivoting motion by being engaged in a position on the anchor plate 92, but the first offset shaft 70 of the intermediary pulley 54 is free to undergo pivoting movement.

The adjustment knob 94 applies the engaging force to secure the roller in position by acting along the axis of the belt tension roller 68. Once secured in position, the belt tension roller 68 is held in the position, and does not move out of position unless released by the user using the adjustment knob 94. The user has control of the tension on the belt. The tension on the two belts is balanced or equalized as between the two belts by the present apparatus.

Figure 7:
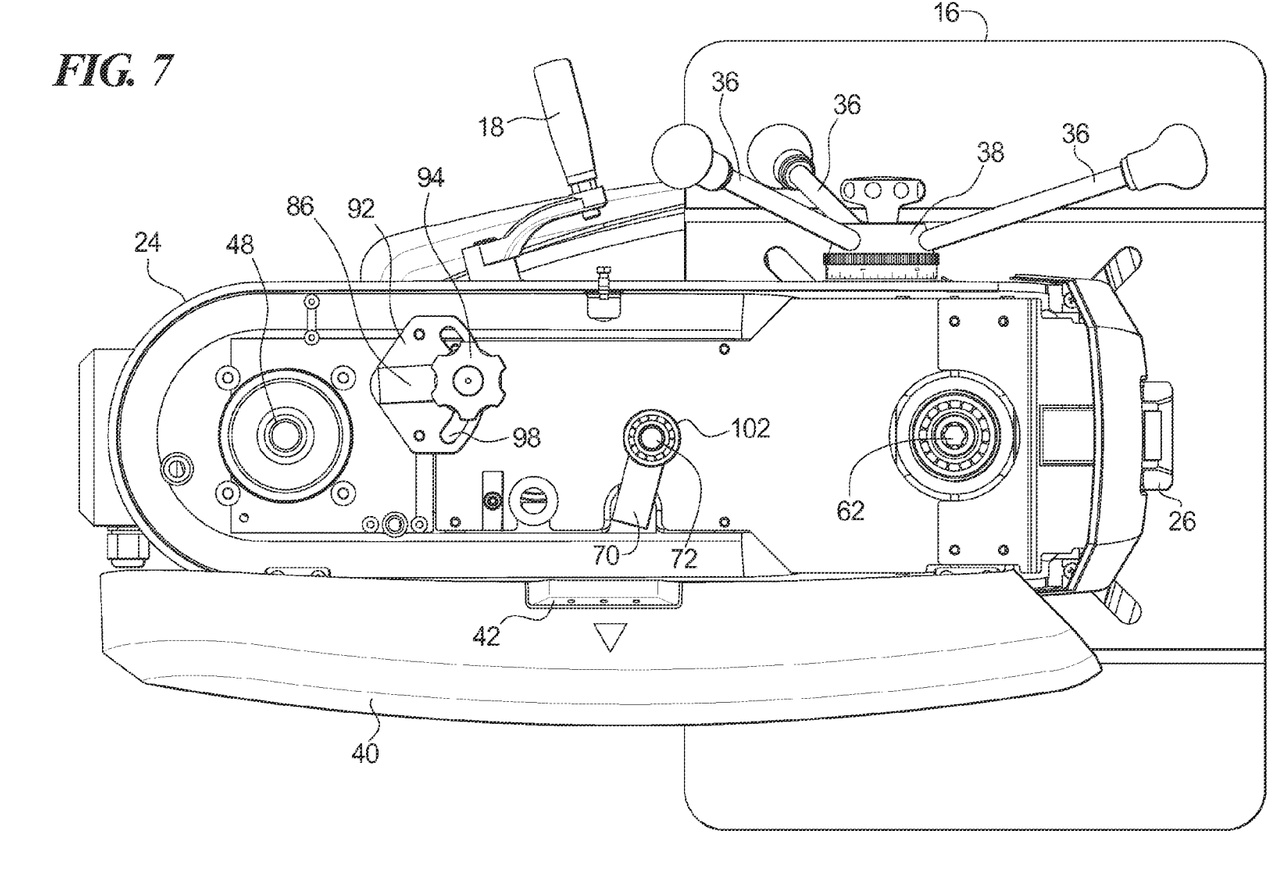
FIG. 7 is a top plan view of the drill press without the cover and without the pulleys and belts of the power transmission system.

FIG. 7 shows the relative arrangement of parts within the housing 24. The motor shaft 48 on which is mounted the first stepped pulley, the second end 72 of the offset shaft 70 on which is mounted the second stepped pulley, and the spindle shaft 62 on which is mounted the third stepped pulley are generally aligned along the centerline of the housing 24, although the position of the second end 88 varies as tension is increased or decreased on the belts 52 and 58. The belt tension roller 68 (under the adjustment knob 94 in this view) is positioned to the side of the centerline and is movable in the arcuate slot 98 along an approximately 75 degree angle of adjustment in the illustrated example. A range of adjustment may span other angles, for example a range of 20 or 30 degrees to as great as 90 degrees or more is also possible. The adjustment knob 94 permits the belt tension roller 68 to be adjusted to any position within the range. Bearings 102 are shown on the second end 88 that permit the second stepped pulley 54 to freely rotate on the second end 88.

Figure 8:
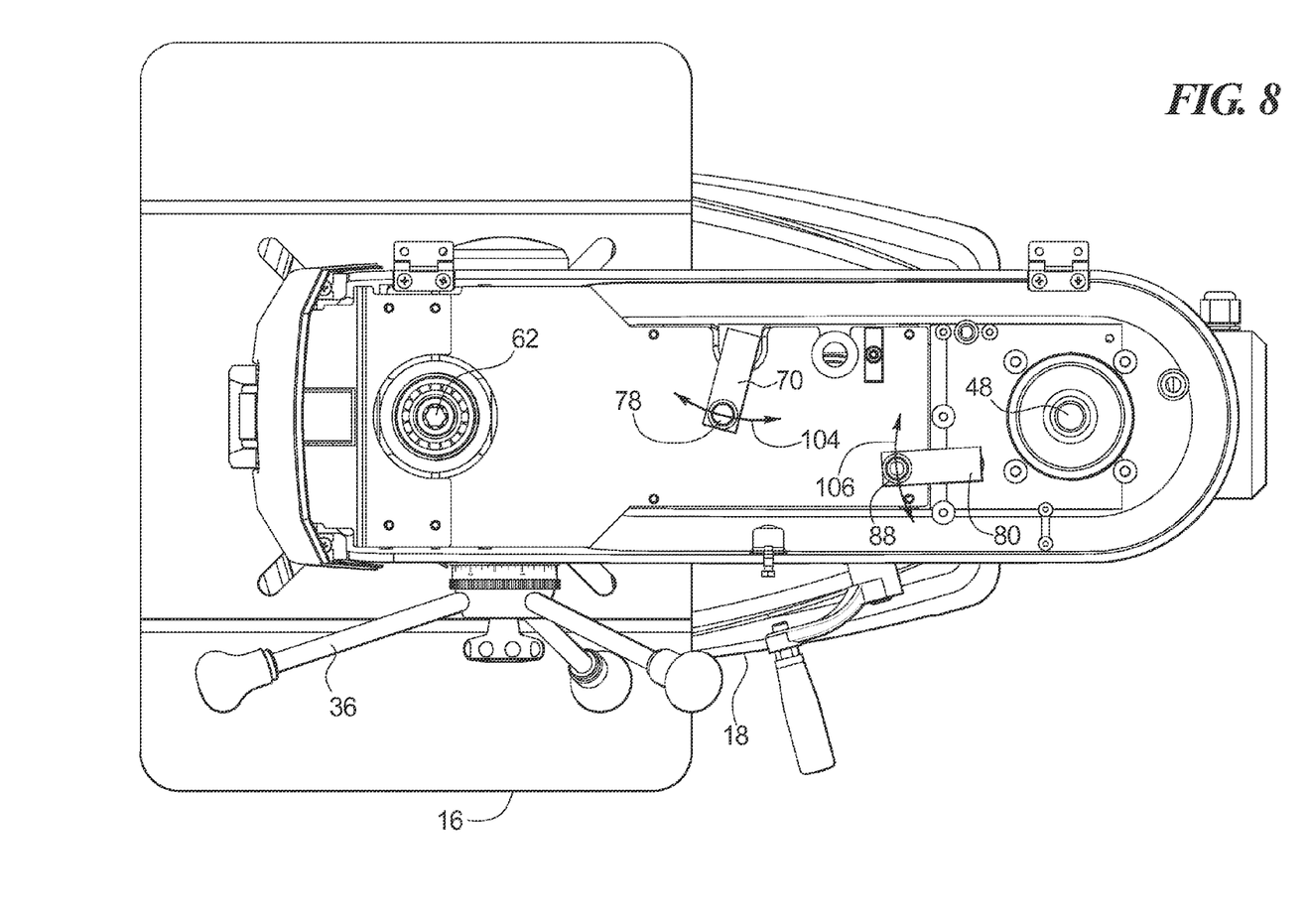
FIG. 8 is a top plan view of the drill press without the cover, belts and pulleys and showing range of movements of the belt tensioner and intermediary pulley.

FIG. 8 provides a similar view to FIG. 7, although from the other side. The first offset shaft 70 permits the second end 78 to be moved along a first arc 104, depending on the tension on the belts 52 and 58. The ability of the end 78 to move freely equalizes the tension on the two belts, even though the tension on only one of the belts is being adjusted by the roller on the second end 88. The second end 88 of the second offset shaft 80 is movable along a second arc 106, although the movement of this second offset shaft 80 is limited to being moved when the adjustment knob 94 is in the released position. The user may release the tension on both belts or apply tension to both belts, or otherwise adjust the tension on both belts, by adjusting the single adjustment knob 94. In certain embodiments, the user may be able to use a single hand to operate the adjustment knob 94 and the position of the roller, and thus adjust belt tension on both belts using a single hand operation.

Figure 9:
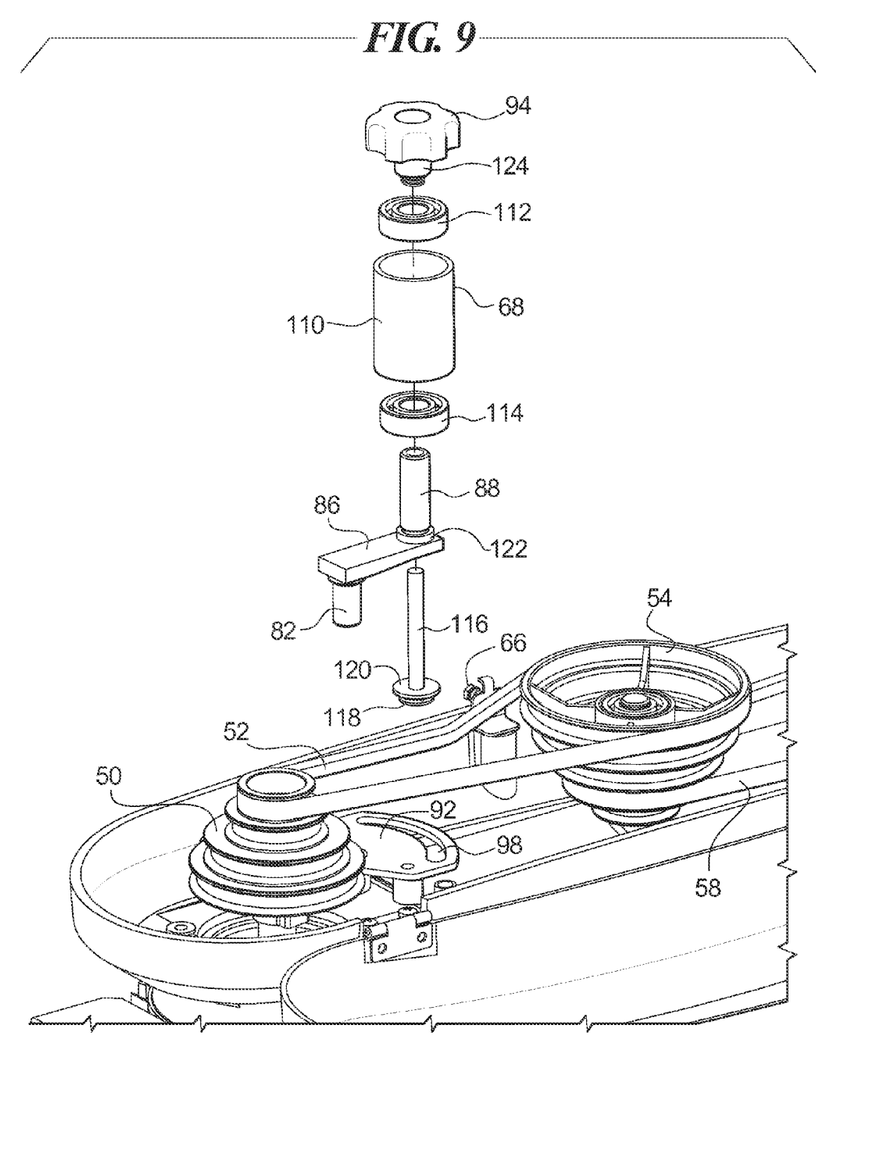
FIG. 9 is an exploded view of the belt tension roller assembly.

Turning to FIG. 9, the belt tension roller 68 includes a roller sleeve 110 having a hollow interior and an exterior belt-engaging surface. The roller sleeve 110 is mounted on a bearing member 112 and a lower bearing member 114 which in turn are mounted on the second end 88 of the transverse member 86. The roller sleeve 110 is able to rotate freely on the second end 88 as a result of the bearing members 112 and 114.

The second end 88 is hollow and accommodates a locking bolt 116. The locking bolt 116 has a bolt head 118 on which is a washer 120. The locking bolt 116 is inserted through the arcuate slot 98 in the anchor plate 92, then through the second end 88, and is engaged by the adjustment knob 94. The adjustment knob 94 and the locking bolt 116 are threadably connected together so that rotation of the adjustment knob 94 tightens or, respectively, loosens the locking bolt 116. When the adjustment knob 94 is rotated to tighten the locking bolt 116, the bolt head 118 and washer 120 are drawn tight against underside of the anchor plate 92 while pushing the transverse member 86 against the top of the anchor plate 92, thereby keeping the belt tension roller 86 in the desired position. The surfaces of the anchor plate 92, washer 120 and/or transverse member 86 may be smooth or textured as desired. By loosening the adjustment knob 94, the gripping force applied by the locking bolt 116 on the anchor plate 92 is reduced or released, permitting adjustment of the belt tension roller 68 to a new position, after which tightening of the adjustment knob 94 secures the roller 68 in the new position.

Regardless of whether the adjustment knob 94 is in the tight or locked position or the loose or released position, the roller 68 can turn freely on the second end 88. To ensure that the lower end of the belt tension roller 68 does not contact the upper surface of the transverse member 86, a flange 122 is provided on the lower end of the second end 88. The inner portion of the lower bearing 114 rests on the flange 122 to provide a clearance between the transverse member 86 and the roller 68. A flange 124 is provided on the adjustment knob 94 to bear against the inner portion of the upper bearing 112 to permit the roller 68 to turn freely relative to the adjustment knob 94 even when tightened.

In many belt drive devices, a belt may be tensioned by pulling on one of the pulleys (moving the pulleys apart), which requires a great deal of force to increase belt tension. The present apparatus and method applies tension by pressing on the side of the belt, which requires less force than pulling on the pulley to provide the same increase in tension on the belt. This change is tension is applied to both belts in this present apparatus.

By releasing the tension on the belt 52 provided by the belt tension roller 68, the user may more easily change the belts from one step position on the stepped pulleys to another. One simple adjustment, possibly using only one hand, makes it possible to change the positions of both belts. If the belts are operated at the lower tension, they may jump out of their step or groove on the pulley. After the belts are in their new positions, the belt tension roller 68 is adjusted to re-apply tension to the belts. This keeps the power transfer effective and prevents the belts from coming out of position on the pulleys. Too much tension on the belts may cause unnecessary wear in the bearings, shortening the life of the power tool or at least requiring more frequent repair. The user can easily apply adequate but not too much tension to the belt using the adjustable roller.

The belts of a preferred embodiment are poly V belts, although single belts are also possible.

Different tools, such as different types of bits, or different materials being worked, require different operating speeds. The present system enables the drill press to be adjusted to the different speeds while ensuring that the belt tension transfers all the motor power to the tool.

The application of sufficient tension to the belts enables the full power of the motor to be transferred to the tool. According to one understanding, if the tool stalls out on the work piece, the motor should also stall. If the tool stalls, or stops rotating, but the motor continues to run, the belts are slipping and the system has a power lose; the belt tension needs to be increased.

Thus, there has been shown and described a drill press having variable speed operation by moving one or more belts to different steps of stepped pulleys. Tension on the belt or belts is continuously adjustable by a belt tension roller that presses against one of the belts and is held in place to provide tension to the belt against which it bears and also provides tension on the second belt, even though the roller does not contact the second belt.

Although shown in a system with two belts, it is also envisioned that the system may include a single belt, or may have three or more belts. Although stepped pulleys are shown, other variable pulleys are also possible. The present system is shown for use on a drill press, which is a preferred embodiment, but other devices, for example, other power tools, that utilize a belt drive may benefit from a belt tensioning apparatus similar to that shown herein and are encompassed within the scope of the present invention. The anchor plate for securing the belt tension roller in a position is provided in an example, but other means of fastening the belt tension roller in a desired position are encompassed herein. Although the illustrated apparatus provides continuous possible positions of the belt tension roller, it is also encompassed herein that a discontinuous or incremental adjustment of the belt tension roller position may be provided. It is preferred that the increments of adjustment be sufficiently small as to provide fine adjustment of the belt tension, although this is not required.

Although other modifications and changes may be suggested by those skilled in the art, it is the intention of the inventors to embody within the patent warranted hereon all changes and modifications as reasonably and properly come within the scope of their contribution to the art.

I claim:

1. A belt drive for a power tool, comprising;
   a housing;
   a motor mounted connected to the housing, the motor having a motor shaft;
   a first stepped pulley on the motor shaft;
   a first belt on the first stepped pulley;
   a second stepped pulley connected to the first belt to receive rotational energy from the first stepped pulley via the first belt;
   a second belt on the second stepped pulley;
   a third stepped pulley connected to the second belt to receive rotational energy from the second stepped pulley via the second belt;
   a tool connected to the third stepped pulley;
   a belt tension roller configured to bear against one of the first belt and the second belt;
   an offset shaft on which the belt tension roller is mounted, the offset shaft being pivotable in a range of possible positions wherein the range of possible positions include positions bearing against the one of the first and second belts to a greater or lesser extent; and
   an adjustment apparatus configured for adjusting a position of the belt tension roller by pivoting the offset shaft and for securing the belt tension roller in a position, the adjustment apparatus includes a user operable control at a first end of the belt tension roller that transmits an engaging force along an axis of the belt tension roller to fasten a second opposite end of the belt tension roller in a selected position to a stationary anchor plate.

2. The belt drive as claimed in claim 1, wherein the belt drive is in a drill press to connect the motor to a chuck of the drill press.

3. The belt drive as claimed in claim 1, wherein the anchor plate defines an arcuate slot in which the offset shaft of the belt tension roller is fastened at various positions as selected by the user via the user operable control.

4. The belt drive as claimed in claim 1, wherein the second stepped pulley is mounted on a pulley offset shaft which is mounted in the housing for rotation so that tension applied to the one of the first and second belts by the belt tension roller is transferred to the other of the first and second belts.

5. The belt drive as claimed in claim 1, wherein the user operable control included an adjustment knob mounted at the first end of the belt tension roller, the adjustment knob being configured to selectively secure the belt tension roller in selected ones of a plurality of tension positions.

6. The belt drive as claimed in claim 1, wherein the adjustment apparatus secures the belt tension roller by acting along the axis of rotation of the belt tension roller.

7. The belt drive as claimed in claim 1, includes a locking bolt extending through an arcuate slot in the anchor plate, the locking bolt extending along the axis of rotation of the belt tension roller to an adjustment knob that is threadably engaged on the locking bolt.

8. A method for adjusting the belt tension in the power tool according to claim 1, comprising: releasing the adjustment apparatus using the user operable control at the first end of the belt tension roller; moving the belt tension roller along the arcuate slot in the stationary anchor plate while the adjustment apparatus is in a released state, the arcuate slot being disposed at the second end of the belt tension roller opposite the first end;
    applying a desired quantity of tension to the belt of the power tool by selecting a position of the belt tension roller; and
    fastening the belt tension roller in the selected position by operating the user operable control at the first end of the belt tension roller to fasten the second end of the belt tension roller in the arcuate slot.

9. The method as claimed in claim 8, wherein the releasing includes rotating an adjustment knob in a first direction to release tension on a locking bolt extending along a rotational axis of the belt tension roller, and
    wherein the fastening includes rotating the adjustment knob in a second direction to apply tension to the locking bolt extending along the rotational axis of the belt tension roller.

10. The method as claimed in claim 8, wherein the releasing, moving, applying and fastening are performed by a user using one hand.

11. A belt drive for a power tool, comprising;
a housing;
a motor mounted connected to the housing, the motor having a motor shaft;
a first stepped pulley on the motor shaft;
a first belt on the first stepped pulley;
a second stepped pulley connected to the first belt to receive rotational energy from the first stepped pulley via the first belt;
a second belt on the second stepped pulley;
a third stepped pulley connected to the second belt to receive rotational energy from the second stepped pulley via the second belt;
a tool connected to the third stepped pulley;
a belt tension roller configured to bear against one of the first belt and the second belt;
an offset shaft on which the belt tension roller is mounted, the offset shaft being pivotable in a range of possible positions wherein the range of possible positions include positions bearing against the one of the first and second belts to a greater or lesser extent, the offset shaft being pivotable along an arcuate path; and
an adjustment apparatus configured for adjusting a position of the belt tension roller by pivoting the offset shaft along the arcuate path and for securing the belt tension roller in any of a plurality of positions, the adjustment apparatus includes:
    an anchor plate stationarily mounted in the housing, the anchor plate defining an arcuate slot concentric with the arcuate path of the offset shaft;
    a locking bolt extending through the arcuate slot and along an axis of rotation of the belt tension roller; and
    an adjustment knob attached to an end of the locking bolt, the adjustment knob being disposed at a first end of the belt tension roller, the adjustment knob being operable to fasten a second end of the belt tension roller to the anchor plate by applying tension along the axis of the belt tension roller.

* * * * *